United States Patent
Sheng et al.

(10) Patent No.: US 7,747,208 B2
(45) Date of Patent: Jun. 29, 2010

(54) COVER STRUCTURE FOR SCAN DEVICE

(75) Inventors: Thomas Sheng, Hsin-Chu (TW); Yuing Chang, Hsin-Chu (TW)

(73) Assignee: Avision Inc. (TW)

( * ) Notice: Subject to any disclaimer, the term of this patent is extended or adjusted under 35 U.S.C. 154(b) by 1306 days.

(21) Appl. No.: 11/235,868

(22) Filed: Sep. 27, 2005

(65) Prior Publication Data
US 2006/0152774 A1    Jul. 13, 2006

(30) Foreign Application Priority Data

Jan. 13, 2005    (TW) ............................. 94100938 A

(51) Int. Cl.
*G03G 15/00* (2006.01)
*H04H 1/107* (2006.01)

(52) U.S. Cl. .................. 399/380; 358/474; 358/305

(58) Field of Classification Search ............ 399/361, 399/363, 380; 358/474, 305; *G03G 15/00; H04H 1/107; H04N 1/107*
See application file for complete search history.

(56) References Cited

U.S. PATENT DOCUMENTS 6,006,064 A * 12/1999 Hashimoto ............. 399/380
6,233,426 B1 * 5/2001 Lee et al. ............... 399/380
6,456,365 B1 * 9/2002 Hosaka et al. ........... 355/75
7,136,201 B2 * 11/2006 Kawasaki et al. ........ 358/474

FOREIGN PATENT DOCUMENTS

| EP | 316870 A2 | * | 5/1989 |
| JP | 01011252 A | * | 1/1989 |
| JP | 09281609 A | * | 10/1997 |
| JP | 2002077539 A | * | 3/2002 |
| JP | 2003280113 A | * | 10/2003 |

OTHER PUBLICATIONS

Machine Translation of JP 2003280113 A.*

* cited by examiner

*Primary Examiner*—Judy Nguyen
*Assistant Examiner*—'Wyn' Q Ha

(57) ABSTRACT

A cover structure for a scan device comprises a cover mounted on a housing of the scan device and an angle-positioning mechanism disposed between the housing and the cover. The cover includes a first cover portion and a second cover portion. The angle-positioning mechanism includes at least a first locating device and a second locating device. When the first cover portion and second cover portion are lifted, the first locating device will produce an interference action to position the first cover portion at a desired opening angle, and the second locating device also will produce an interference action to position the second cover portion at a desired opening angle.

8 Claims, 9 Drawing Sheets

COVER STRUCTURE FOR SCAN DEVICE

BACKGROUND OF THE INVENTION

1. Field of the Invention

The present invention relates to a cover structure, and more particularly to a cover structure mounted on a housing of a scan device, such as a scanner, a copy machine, a multifunctional office machine or the like. The cover can be closed so as to cover the document to be scanned. When the cover is opened, a part of the cover can be positioned a certain distance above the housing but is still able to cover the scan window, so that the document can be scanned easily without opening and closing the cover repeatedly, thus substantially saving the scanning time.

2. Description of the Prior Arts

A conventional image input device, such as a flatbed scanner or a copy machine, generally includes a housing and a cover. The cover is a board structure pivotally coupled to the housing, so that the cover can be pivotally raised or lowered relative to the housing. Since there is no positioning device disposed between the cover and the housing, an angle formed between the covers and the housing will always be greater than 90 degrees when the cover is raised to an open position, in order to keep the cover open.

In operation, the user has to raise the cover to an open position to put a document on the scan window, and lower down the cover to press on document before the scan operation can begin. As for the scan operation that do not need to consider the scanning time or when the documents to be scanned are few, the user may not feel inconvenient to open the cover and lower it down repeatedly whenever each document is scanned. However, as for the scan operation that has to consider the scanning time, for documents such as certificates, checks or the like, or the quantity of documents to be scanned is large, this scan operation will be very inconvenient and time-consuming.

The user can raise the cover to an open position over 90 degrees with respect to the housing so as to keep the cover open, or can disassemble the cover from the housing, so that the time of raising and lowering the cover during the scan operation can be saved. However, since the cover does not cover the document, the reflective lights that are not reflected from the document will be transmitted into the image-sensing element, adversely affecting the scan quality.

The present invention has arisen to mitigate and/or obviate the afore-described disadvantages.

SUMMARY OF THE INVENTION

The primary objective of the present invention is to provide a cover structure for a scan device capable of positioning the cover at a desired opening angle.

The secondary objective of the present invention is to provide a cover structure for a scan device, which enables scanning process to be performed without opening and closing the cover repeatedly.

A cover structure for a scan device in accordance with the present invention comprising:

a cover mounted on a housing of the scan device, comprising:

a first cover portion being pivotally coupled to the housing, and a second cover portion being pivotally connected to and rotatable about the first cover portion; and an angle-positioning mechanism, disposed between the housing and the cover, comprising:

at least a first locating device disposed between the first cover portion and the housing; and at least a second locating device disposed between the first cover portion and the second cover portion.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
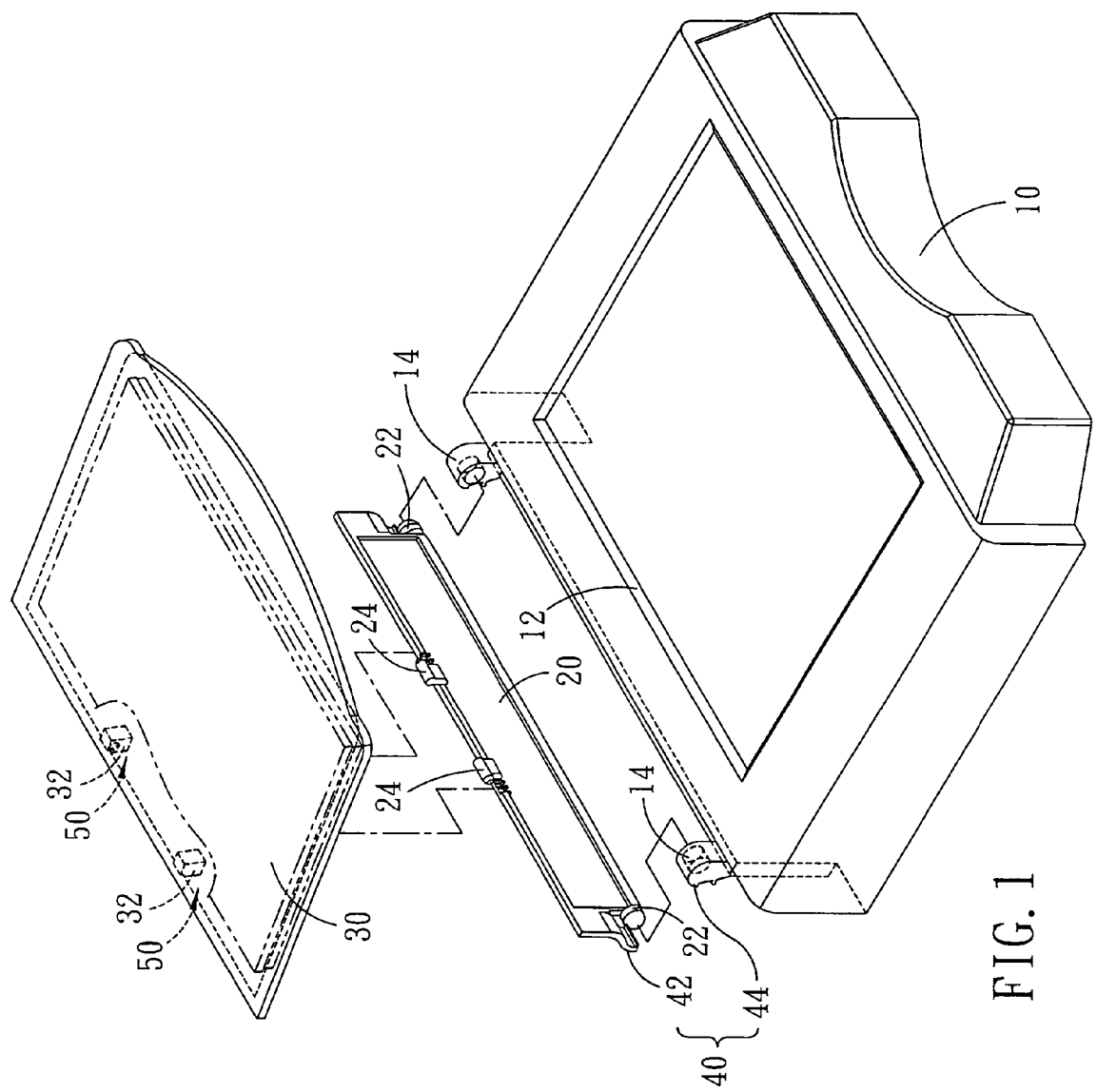
FIG. 1 is an exploded view of a cover structure for a scan device in accordance with a first embodiment of the present invention.
Figure 2:
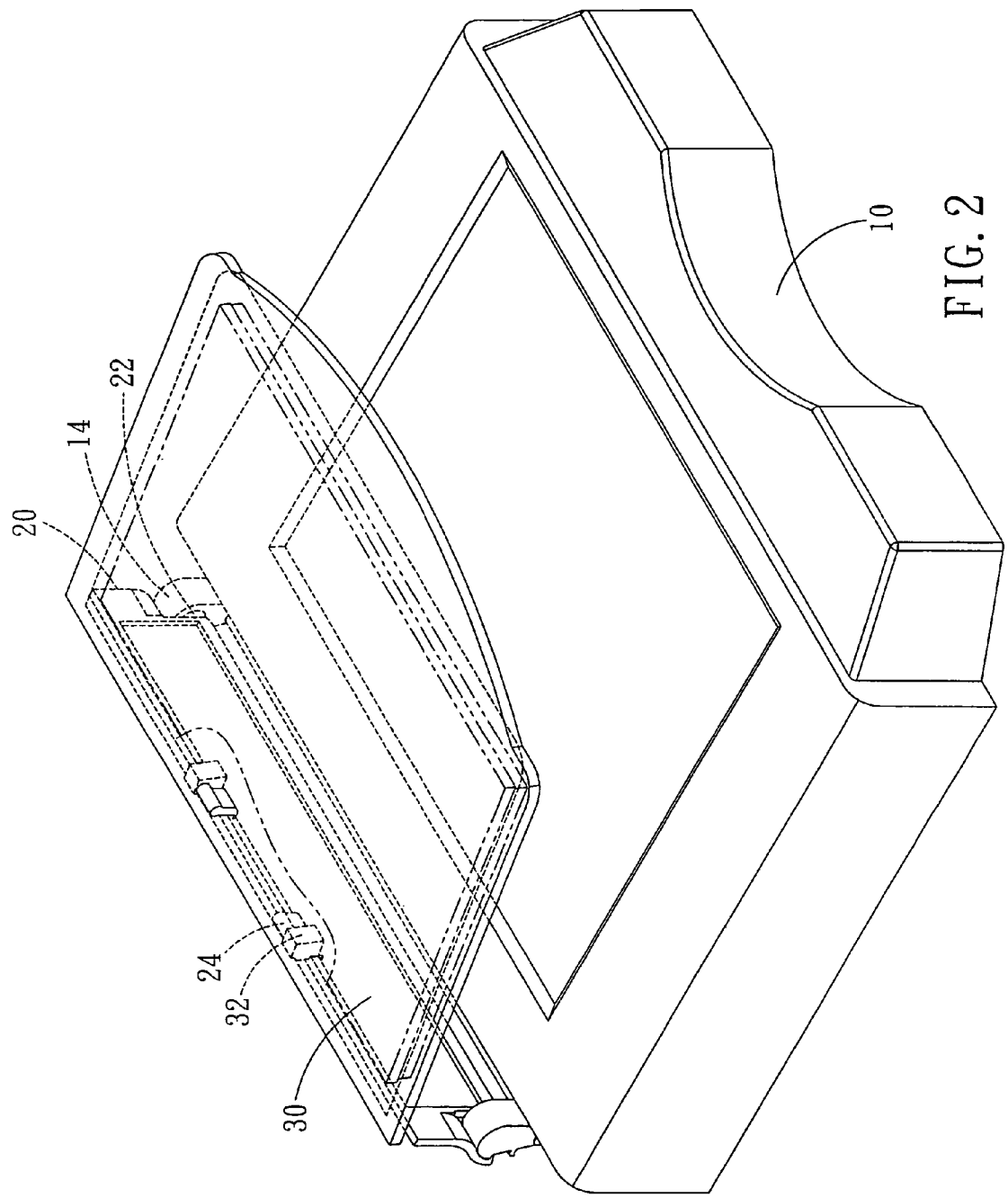
FIG. 2 is an assembly view of a cover structure for a scan device in accordance with the first embodiment of the present invention.

Referring to FIGS. 1 and 2, a scan device in accordance with a first embodiment of the present invention is shown and comprises a housing 10, a first cover portion 20, and a second cover portion 30. On the surface of the housing 10 is provided a scan window 12, and at a lateral side of the housing 10 are arranged two opposite pivot seats 14.

The cover structure includes a first cover portion and a second cover portion 20, 30, the first cover portion 20 is provided at a side thereof with a pair of sub-shafts 22 that are to be inserted in the pivot seats 14 of the housing 10, so as to enable the first cover portion 20 to be lifted or lowered pivotally relative to the housing 10. At another side of the first cover portion 20 are disposed two sub-shafts 24 that are located oppositely to the sub-shafts 22.

The second cover portion 30 is larger than the first cover portion 20 and provided at a side thereof with two pivotal blocks 32 that vertically project out of the surface of the second cover portion 30.

The two sub-shaft 24 of the first cover portion 20 are pivotally coupled to the pivotal blocks 32 of the second cover portion 30, so that the first cover portion 20 and the second cover portion 30 can be opened and closed relative to each other.

Figure 3:
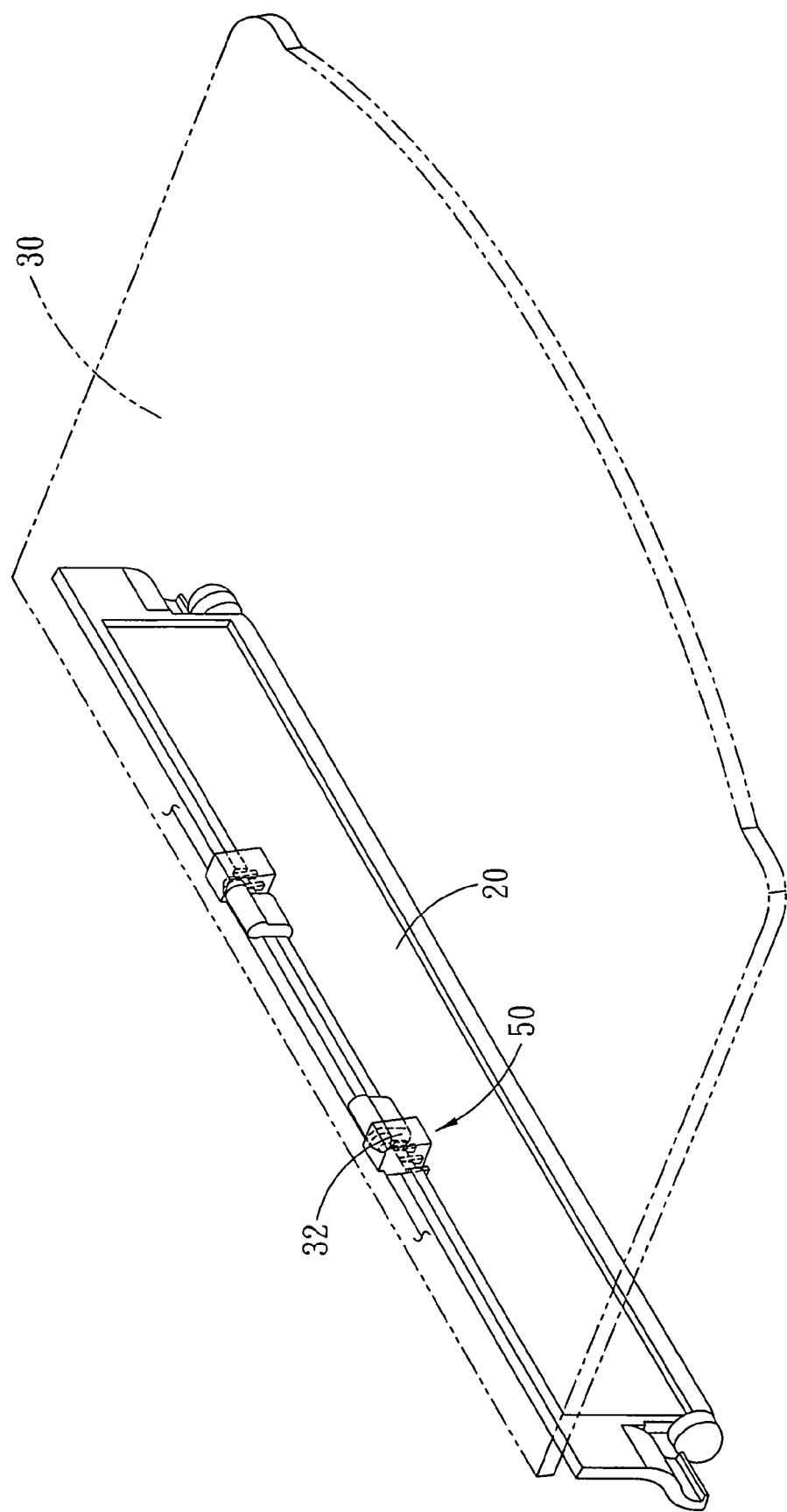
FIG. 3 is assembly view of showing a first and a second cover portion of the cover structure for a scan device in accordance with the first embodiment of the present invention.

Referring to FIGS. 1 and 3, between the first cover portion 20 and the housing 10 is arranged a first locating device 40 that can control the opening angle of the first cover portion 20 (the angle between the first cover portion 20 and the housing 10). The first locating device 40 includes two claw structures 42 and two locating projections 44. The claw structures 42 are located at an end of the first cover portion 20, while the locating projections 44 are formed on the surface of the pivot seats 14. It will be noted that the claw structures 42 are flexible since they only has an end coupled to the first cover portion 20. The locating projections 44 can be integrally formed with the pivot seats 14.

Referring to FIG. 3, between the first cover portion and second cover portion 20, 30 is provided a second locating device 50 that can control the opening angle of the second cover portion 30 (the angle between the first cover portion and the second cover portion). The second locating device 50 can be a projection that is vertical to the surface of the second cover portion 30, so that when the second cover portion 30 is lifted at an angle with respect to the first cover portion 20, the second locating device 50 can press against the inner surface of the first cover portion 20.

In this way, the angle between the first cover portion and second cover portion can be fixed, namely, the first cover portion can be positioned at an angle with respect to the second cover portion.

Since the second locating device 50 is a projection vertical to the second cover portion 30, and on the surface of the second cover portion 30 are also provided the pivotal blocks 32, the second locating device 50 can be unitary with the pivotal blocks 32.

If the second locating device 50 is not unitary with the pivotal blocks 32, the first cover portion 20 and the second cover portion 30 can be pivotally coupled to each other by other means.

Figure 4:
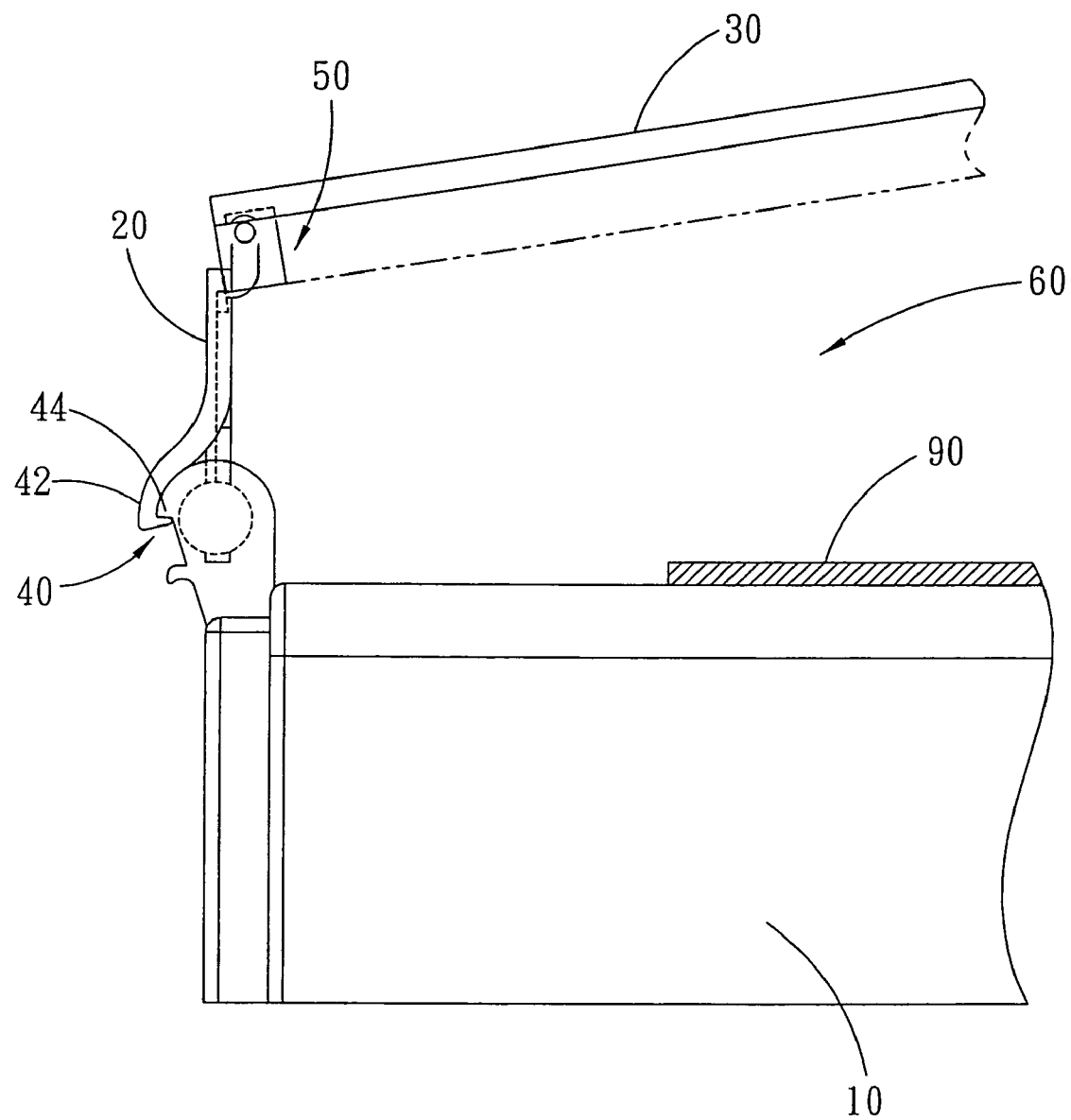
FIG. 4 is an operational view of the cover structure for a scan device in accordance with the first embodiment of the present invention, wherein the cover is opened.

Referring to FIG. 4, when the cover is lifted upward, the claw structures 42 of the first locating device 40 will be hooked with the locating projection 44, so as to fix the opening angle of the first cover portion and restrict it within a desired range. The second cover portion 30 is disposed at an opening angle relative to the first cover portion 20 in a manner that the second locating device 50 abuts against the bottom surface of the first cover portion 20. The opening angle of the second cover portion 30 will be fixed with the effect of the deadweight of the second cover portion 30. At this moment, the second cover portion 30 is positioned a certain distance 60 above the housing 10, so that through the distance 60, the user can put a document 90 on or remove it from the housing 10.

Therefore, the document 90 can be scanned easily without the cover being opened and closed repeatedly, substantially saving the scanning time. In other words, the scan work that has a great number of documents to be scanned or the scan work that needs to be finished in a relative short time can be easily done with the aid of the scan device of the present invention.

Figure 5:
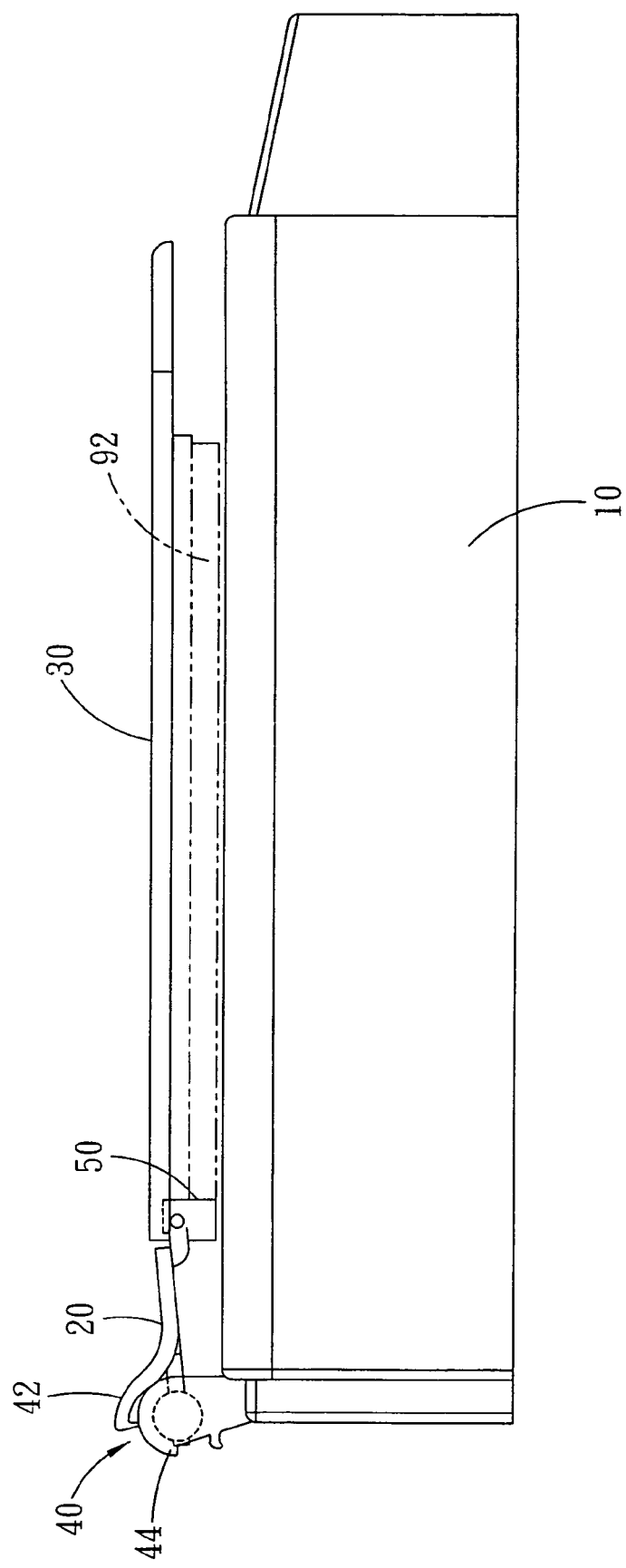
FIG. 5 is an operational view of the cover structure for a scan device in accordance with the first embodiment of the present invention, wherein the cover is closed.

Referring to FIG. 5, when the cover is closed, the first cover portion 20 and the second cover portion 30 will be positioned at the same level, meanwhile, the claw structures 42 of the first locating device 40 will be released from the locating projection 44, while the second locating device 50 will be close to the housing 10. A cushion 92 can be provided on the inner surface of the cover, and its thickness can be equal to the height of the second locating device 50, this can prevent the second cover portion 30 from being positioned in a hanging fashion, and further can keep the second locating device 50 from overly pressing against the housing 10.

Figure 6:
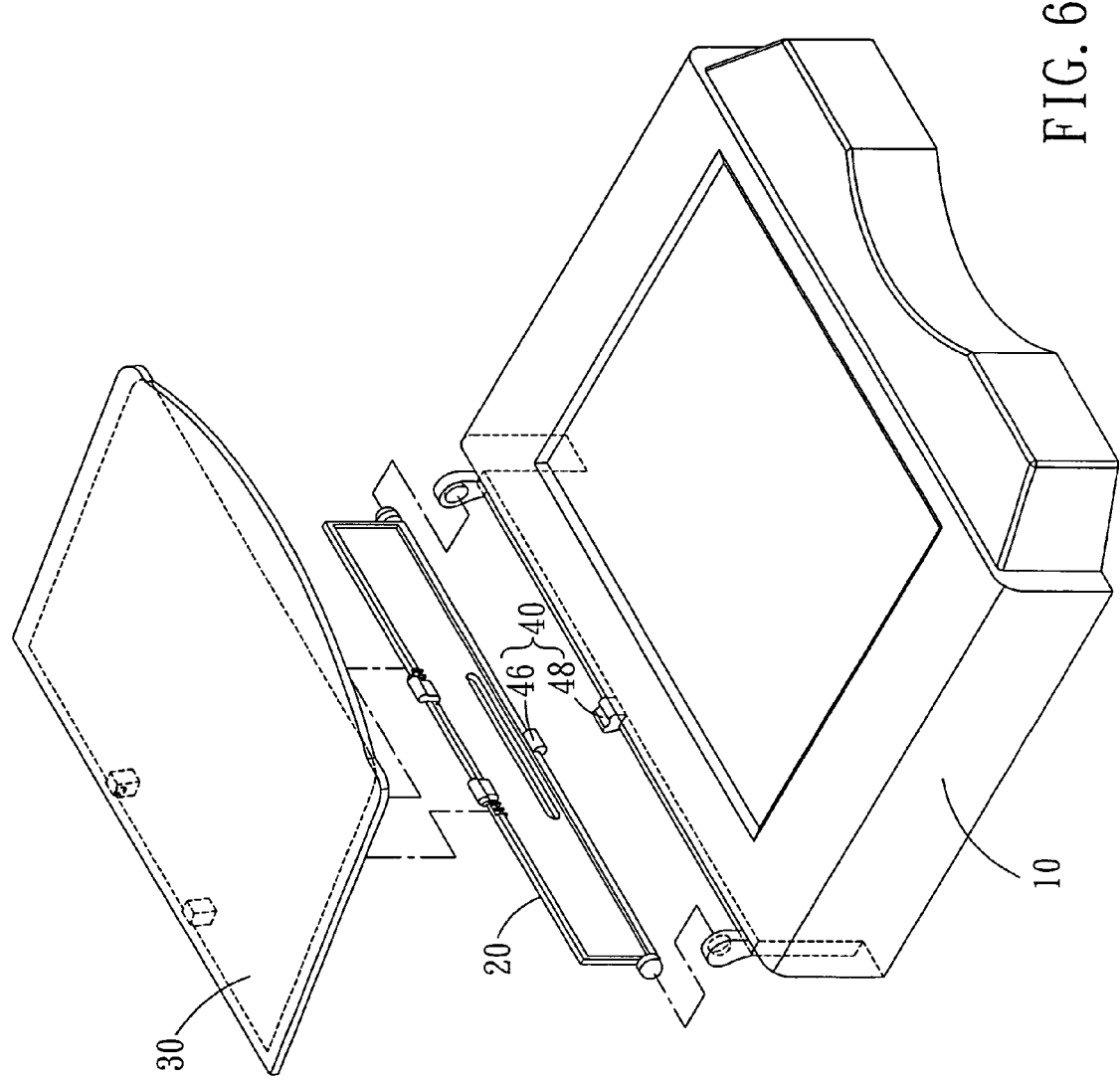
FIG. 6 is an exploded view of a cover structure for a scan device in accordance with a second embodiment of the present invention.
Figure 7:
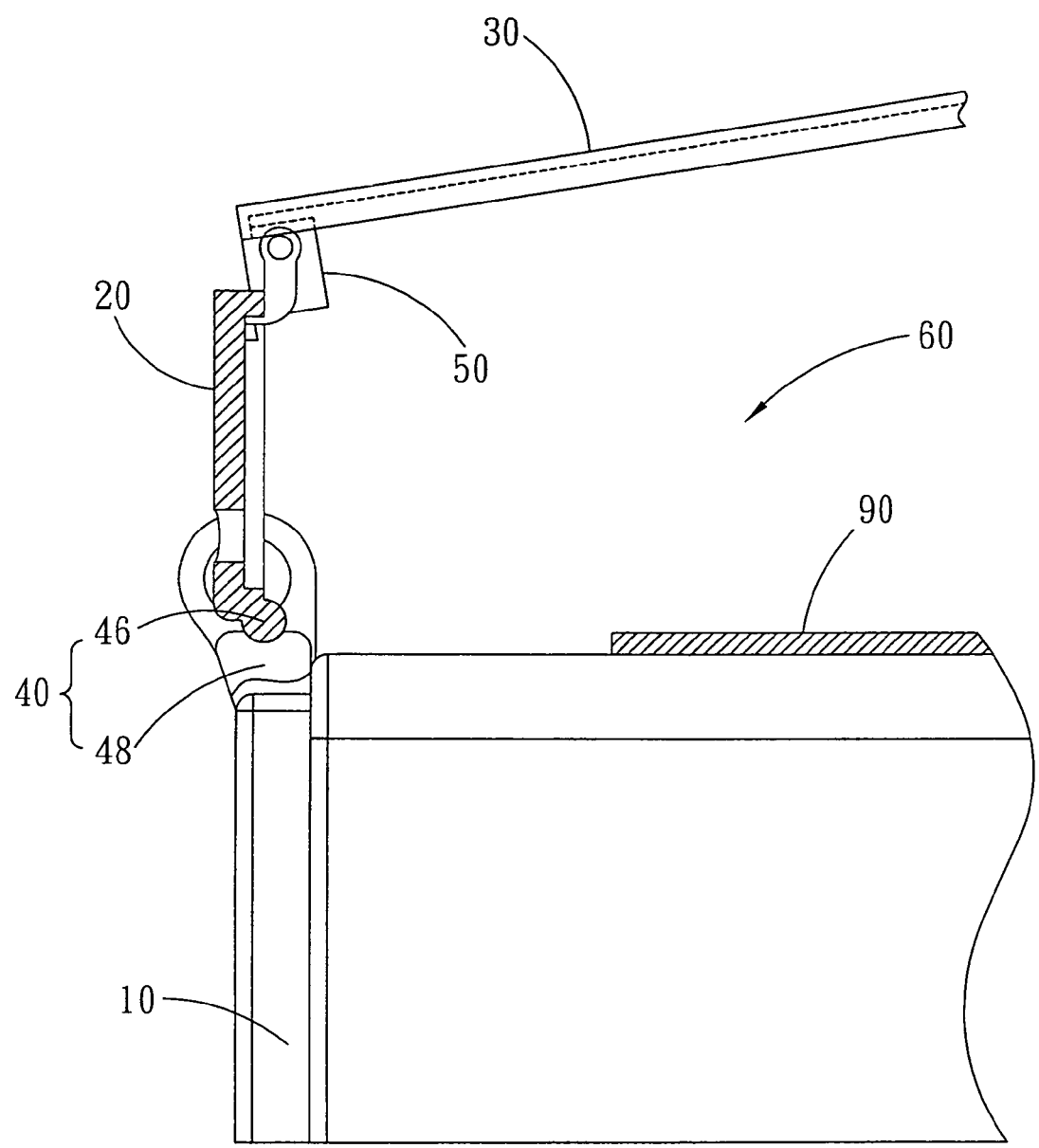
FIG. 7 is an operational view of the cover structure for a scan device in accordance with the second embodiment of the present invention, wherein the cover is opened.

Referring to FIGS. 6 and 7, a scan device in accordance with a second embodiment of the present invention is shown and comprises a housing 10, a first cover portion 20, and a second cover portion 30. The housing 10, the first cover portion 20 and the second cover portion 30 are structurally similar with that of the first embodiment, except that:

The first locating device 40 in this embodiment includes a shaft 46 and a shaft seat 48. The shaft 46 is disposed at a side of the first cover portion 20, while the shaft seat 48 is located on the housing 10. When the first cover portion 20 is mounted on the first housing 10, the shaft 46 will be received in the shaft seat 48. It will be noted that the shaft 46 is eccentrically disposed with respect to the shaft seat 48. Since the shaft 46 will be positioned in an eccentric fashion when it is received in the shaft seat 48, an interference effect will be caused for the first cover portion 20 being positioned at an opening angle as desired.

The second locating device 50 between the first cover portion and second cover portion 20, 30 is also structurally similar to the first embodiment, and also can produce an interference action between the first cover portion and second cover portion 20, 30, so as to fix the opening angle of the second cover portion 30.

The distance 60 formed between the housing 10 and the second cover portion 30 also enables the document 90 to be placed on or removed from the housing 10 freely.

Furthermore, the document 90 also can be scanned easily without the cover being opened and closed repeatedly, thus substantially saving the scanning time.

Figure 8:
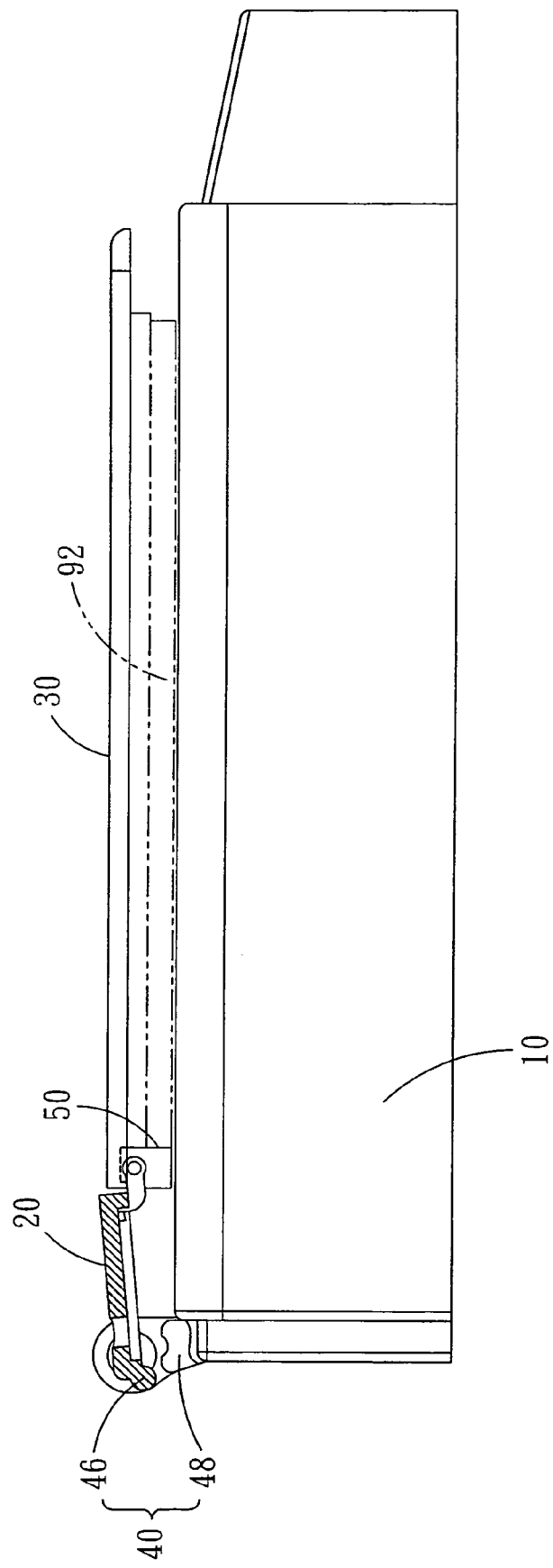
FIG. 8 is an operational view of the cover structure for a scan device in accordance with the second embodiment of the present invention, wherein the cover is closed.

Referring to FIG. 8, when the cover is closed, the first cover portion 20 and the second cover portion 30 will be positioned at the same level. At this moment, the shaft 46 of the first locating device 40 will be released from the shaft seat 48, while the second locating devices 50 will approach the housing 10. A cushion 92 can be provided on the inner surface of the cover, and its thickness can be equal to the height of the second locating devices 50, this can prevent the second cover portion 30 from being positioned in a hanging fashion, and further keep the second locating devices 50 from overly pressing against the housing 10.

Figure 9:
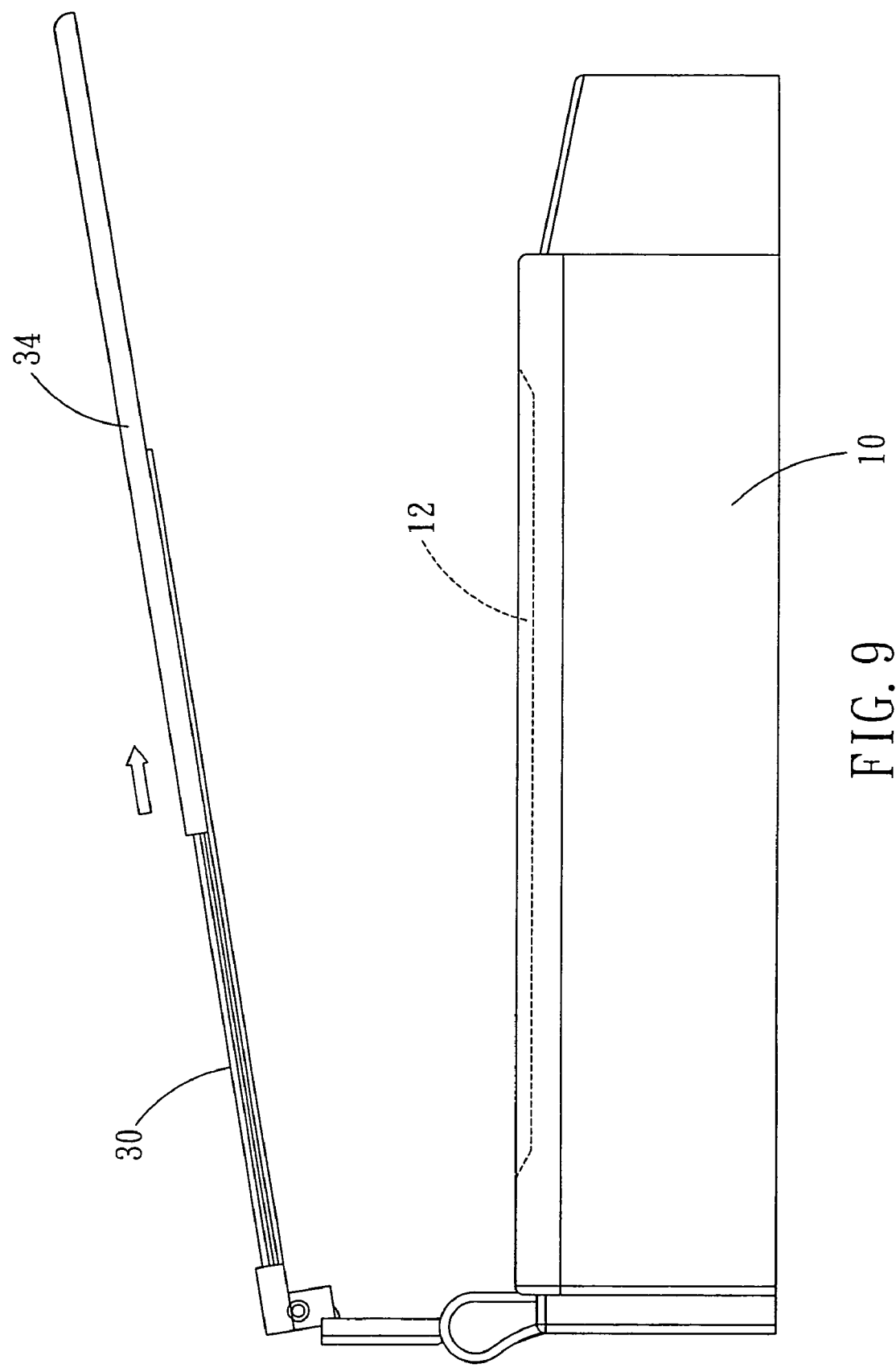
FIG. 9 is an operational view of the cover structure for a scan device in accordance with the second embodiment of the present invention, wherein the cover is provide with a slide cover.

Referring to FIG. 9, the previously mentioned second cover portion 30 can be equipped with a slide cover 34. After the second cover portion 30 is raised, the user can pull out the slide cover 34, so as to fully cover the scan window of the housing 10.

The above-mentioned embodiments illustrate the design concept of the present invention that after the first cover portion 20 and the second cover portion 30 are lifted, the first locating device 40 and the second locating device 50 will produce an interference action to enable the first cover portion 20 and the second cover portion 30 to be positioned at a desired opening angle, so that the document 90 can be placed on or removed from the housing 10 freely. Besides, since the second cover portion 30 will be positioned above the housing 10 to cover the scan window, the lights not reflected from the document will not be transmitted to the optical sensing unit, and consequently, a good scan result can be ensured.

In addition, the locating projections of the locating device of the first cover portion 20 and the second cover portion 30 also can be arranged on the second cover portion. On the abutment surface of the first cover portion 20 and that of the second cover portion 30 can formed of an inclined angle, such that, when the cover is opened, the two cover portions can be positioned and fixed at an angle with respect to each other through the cooperation of the two incline-angled surfaces.

When the cover is closed, the incline-angled surface of the first cover portion 20 and that of the second cover portion 30 do not contact each other. Furthermore, the claw structures are not limited to be located only on the first cover portion 20, and the locating projections are not limited to be located only on the second cover portion 30.

While we have shown and described various embodiments in accordance with the present invention, it should be clear to those skilled in the art that further embodiments may be made without departing from the scope of the present invention.

What is claimed is:

1. A cover structure for a scan device comprising:
   a cover mounted on a housing of the scan device, comprising:
      a first cover portion being pivotally coupled to the housing, and
      a second cover portion being pivotally connected to and rotatable about the first cover portion; and
      an angle-positioning mechanism, disposed between the housing and the cover, comprising:
         at least a first locating device disposed between the first cover portion and the housing, comprising:
            a claw structure, located at an end of the first cover portion; and
            a locating projection, formed on the housing and located oppositely to the claw structure; and
         at least a second locating device disposed between the first cover portion and the second cover portion;
      wherein when the first cover portion and second cover portion are being lifted, the first locating device will produce an interference action between the first cover portion and the housing of the scan device, so as to position the first cover portion at a desired opening angle with respect to the housing, while the second locating device will produce an interference action between the first cover portion and the second cover portion, so as to position the second cover portion at a desired opening angle with respect to the housing;
      wherein as the first cover is raised, the claw structure will hook on the locating projection so as to produce an interference action.

2. The cover structure as claimed in claim 1, wherein the second locating device is a projection formed on a bottom surface of the second cover portion.

3. The cover structure as claimed in claim 1, wherein the second cover portion is provided with a slide cover.

4. A cover structure disposed on a housing of a scan device, the raising mechanism comprising:
   a first cover portion pivotally coupled to pivotal seats installed on the housing;
   a second cover portion pivotally coupled to and rotatable about the first cover portion;
   at least a first locating device disposed between the first cover portion and the housing, comprising:
      a claw structure disposed at an end of the first cover portion; and
      a locating projection formed on the pivotal seats of the housing; and
   at least a second locating device in the form of a projection formed at a bottom surface of the second cover portion and located close to a connection portion between the first cover portion and the second cover portion;
   wherein when the first cover portion and second cover portion are being lifted, the first locating device will produce an interference action between the first cover portion and the housing, so as to position the first cover portion at a desired opening angle with respect to the housing, while the second locating device will produce an interference action between the first cover portion and the second cover portion, so as to position the second cover portion at a desired opening angle with respect to the housing.

5. The cover structure as claimed in claim 4, wherein an end of the claw structure of the first locating device is connected to the first cover portion, while another end of the claw structure is loose, so that the claw structure is flexible.

6. The cover structure as claimed in claim 4, wherein the locating projection of the first locating device is integrally formed with the pivotal seats of the housing.

7. The cover structure as claimed in claim 4, wherein the projection of the second locating device is a pivotal connecting member between the first and second cover portions.

8. The cover structure as claimed in claim 4, wherein the second cover portion is provided with a slide cover.

* * * * *